P. THACHER.
BEARING.
APPLICATION FILED JULY 18, 1910.
1,045,908.
Patented Dec. 3, 1912.
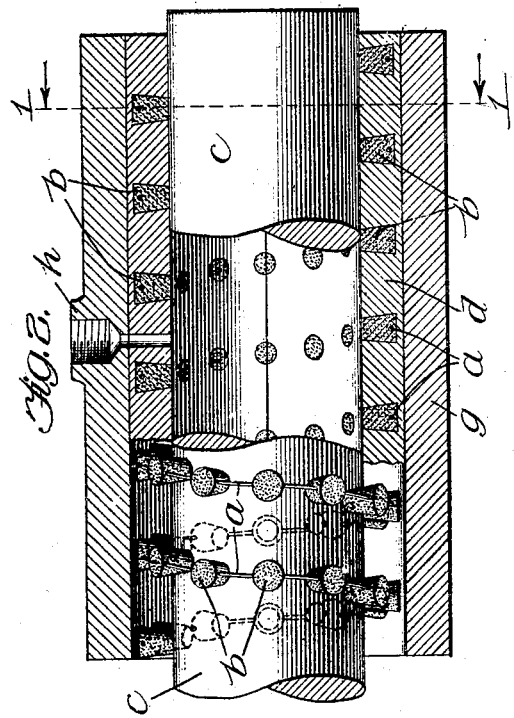
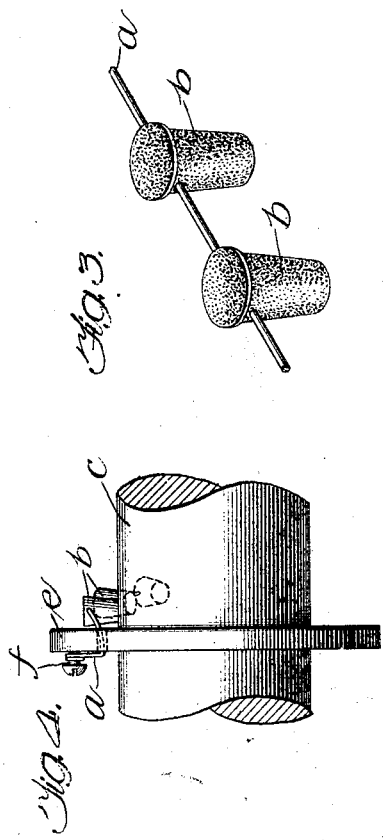
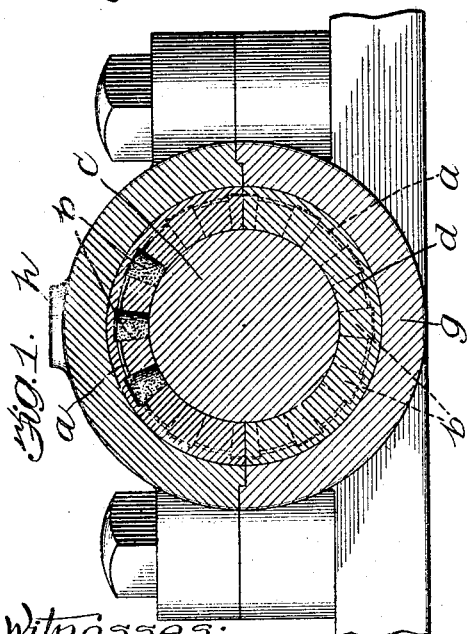
Witnesses:
Inventor:
Peter Thacher
By G. L. Gragg
Atty.

UNITED STATES PATENT OFFICE.

PETER THACHER, OF CHICAGO, ILLINOIS.

BEARING.

1,045,908.  Specification of Letters Patent.  Patented Dec. 3, 1912.

Application filed July 18, 1910. Serial No. 572,427.

*To all whom it may concern:*

Be it known that I, PETER THACHER, citizen of the United States, residing at Chicago, in the county of Cook and State of Illinois, have invented a certain new and useful Improvement in Bearings, of which the following is a full, clear, concise, and exact description, reference being had to the accompanying drawings, forming a part of this specification.

My invention relates to bearings, and more particularly to a component element entering into the construction thereof, which include segregated bodies of lubricant, such as graphite. Hitherto, it has been the practice to support these segregated bodies of lubricant upon perforated or imperforate sheets which were wrapped around the shafts to be borne by the bearing, or about mandrels of the sizes of the shafts and thereafter inclosed in brasses or bodies having bores similar to those of the brasses, whereafter Babbitt or other bearing metal would be poured into the inclosed spaces surrounding the shafts or mandrels firmly to embed the lubricant bodies in place.

With the devices of the prior art, the bodies of lubricant were held in fixed and substantially unchangeable distances apart. By means of my invention, the lubricant bodies may have distances therebetween regulated to such an extent as to adapt the lubricant bodies to shafts and brasses of differing diameters, and preferably so that no shaft zone is unencountered by the lubricant bodies, thereby assuring thorough lubrication throughout those shaft lengths that are inclosed by bearings.

The element of my invention that enters into the construction of bearings includes a string and bodies of lubricant engaged thereby and distributed in tandem along the length thereof. I use the term string in this description and in the claim in the sense of a single or multiple stranded long metallic or non-metallic body of suitable cross-section, preferably circular, which is sufficiently flexible for the purpose of this invention and which is not formed into a fabric in which the lubricant holding stretches of the component string would be held in substantially fixed relation to hold laterally adjacent lubricant bodies in substantially fixed relation, for if the string were formed into such fabric it would lose its character as a string in the common acceptation of the term and the charcter required of it in accordance with the present invention.

I will explain my invention more fully by reference to the accompanying drawing showing the preferred embodiment thereof, in which—

Figure 1 is a cross-sectional view on line 1 1 of Fig. 2 of a bearing constructed in accordance with the invention; Fig. 2 is a longitudinal sectional view of the construction shown in Fig. 1, a section of the shaft being broken away; Fig. 3 illustrates a length of the string with bodies of lubricant material thereupon; and Fig. 4 is a detail view illustrating one step taken in making a bearing.

Like parts are indicated by similar characters of reference throughout the different figures.

The string $a$ is preferably in the form of wire and is placed in engagement with the lubricant bodies $b$, preferably made of graphite, by having the larger ends of the graphite molded about the same, the graphite bodies desirably being in the nature of truncated cones whose smaller ends are to be placed next the shaft $c$ so that the graphite bodies are not liable to be dislodged from the Babbitt metal $d$ in which they are afterward embedded, as will appear. The graphite bodies $b$ are distributed along the string $a$ at intervals which are preferably regular.

In forming a bearing with the lubricating element of my invention, the string $a$ is desirably wound spirally about the shaft $c$ or a mandrel of equivalent diameter, the pitch of the spiral being desirably such that no shaft zone will be out of contact with a graphite body. The ends of the wire or string may be anchored in any suitable way. I have illustrated one of two end plates $e$ located at the opposite ends of the space to be filled with the Babbitt metal. Each of these plates, which are preferably removable, carries an anchorage screw $f$ about which the wire string is wrapped after it is passed through an opening in the plate. The brasses $g$, or other suitable mold for the Babbitt metal, is located between the plates $e$, these plates, in addition to holding the opposite ends of the string $a$, also closing the ends of the bores formed by the brasses, whereafter the Babbitt metal may be poured through the opening $h$ into the space confined by the brasses, shaft and plates, the poured metal finding its way readily between the spaces intervening between the adjacent spiral stretches of string and the lubricant bodies distributed in tandem along the same and desirably radially disposed. After the Babbitt or other bearing metal has been poured, the bearing is finished in the usual manner.

While I have herein shown and particularly described the prefererd embodiment of my invention, I do not wish to be limited to the precise construction shown, but

Having thus described my invention, I claim as new and desire to secure by Letters Patent the following:

A bearing including a shaft; a body in which said shaft is journaled; portions of lubricating material; a body in which said portions of lubricating material are embedded; and a string spirally wound about the shaft, said string being engaged by said portions of lubricating material that are spaced apart in tandem along the string.

In witness whereof, I hereunto subscribe my name this 8th day of July, A. D., 1910.

PETER THACHER.

Witnesses:
G. L. CRAGG,
JOHN H. MCELROY.